J. H. MATHER.
Eye-Glass for Watchmakers.

No. 199,218. Patented Jan. 15, 1878.

UNITED STATES PATENT OFFICE.

JOHN H. MATHER, OF CHICAGO, ILLINOIS.

IMPROVEMENT IN EYEGLASSES FOR WATCH-MAKERS.

Specification forming part of Letters Patent No. 199,218, dated January 15, 1878; application filed August 23, 1877.

*To all whom it may concern:*

Be it known that I, JOHN H. MATHER, of Chicago, in the county of Cook and State of Illinois, have invented a new and useful Improvement in Eyeglasses, which improvement is fully set forth in the following specification and accompanying drawings, in which—

Figure 1:
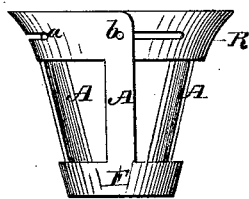
Figure 2:
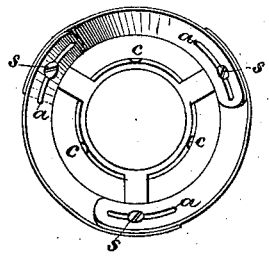
Figure 3:
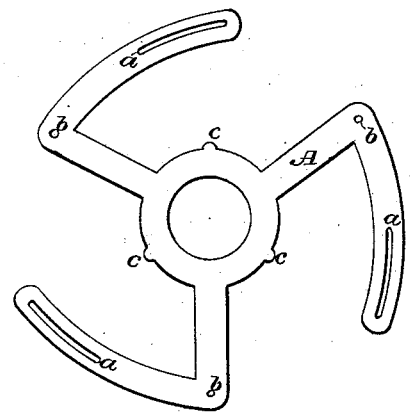

Figure 1 is a perspective view; Fig. 2, a front view, and Fig. 3 a view of a blank for forming the frame of my eyeglass.

The object of my invention is to furnish an eyeglass that will not condense vapors when it is cold and is then suddenly brought in proximity to the eye, and also to make a frame for the glass that may be adjusted to different sizes.

In the drawings, A A A are extensible arms on the glass-frame F. Each arm has a screw-hole, $b$, and a slot, $a$.

The elasticity of the arms allows them to be moved one over the other, the screws $s$ holding them at the desired distance apart, thus allowing the rim R to be adjusted to any size desired.

$c$ are projections or clamps for holding the lens in the frame.

It will be seen that a lens fitted into a skeleton frame permits the passage of air between the eye and the lens, and thus prevents the lens from collecting moisture.

Having thus described my invention, I claim as new and desire to secure by Letters Patent—

1. An eyeglass having the lens fastened in a skeleton frame, substantially as shown, and for the purpose described.
2. An eyeglass having an extensible rim, R, composed of two or more extensible arms, substantially as shown and described.
3. In an eyeglass, the skeleton frame made of one piece, substantially as shown and described.

JOHN HUBBARD MATHER.

Witnesses:
B. FRESE,
F. W. HUNT.